(12) United States Patent
Chen et al.

(10) Patent No.: US 12,537,255 B2
(45) Date of Patent: Jan. 27, 2026

(54) INSULATION TAPE, BATTERY UNIT, BATTERY AND POWER CONSUMING APPARATUS

(71) Applicant: CONTEMPORARY AMPEREX TECHNOLOGY (HONG KONG) LIMITED, Hong Kong (CN)

(72) Inventors: Xin Chen, Ningde (CN); Xiaoming Ge, Ningde (CN); Haifeng Yuan, Ningde (CN); Jiayuan Lu, Ningde (CN); Zhongxing Xiao, Ningde (CN); Shuaifeng Su, Ningde (CN); Junhua Zhang, Ningde (CN); Yang Liu, Ningde (CN); Jian Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 561 days.

(21) Appl. No.: 18/063,639

(22) Filed: Dec. 8, 2022

(65) Prior Publication Data

US 2023/0106775 A1 Apr. 6, 2023

Related U.S. Application Data

(63) Continuation of application No. PCT/CN2021/108769, filed on Jul. 27, 2021.

(51) Int. Cl.
*H01M 50/24* (2021.01)
*H01M 50/103* (2021.01)
(Continued)

(52) U.S. Cl.
CPC ......... *H01M 50/24* (2021.01); *H01M 50/103* (2021.01); *H01M 50/121* (2021.01);
(Continued)

(58) Field of Classification Search
None
See application file for complete search history.

(56) References Cited

U.S. PATENT DOCUMENTS

| 2013/0034764 A1 | 2/2013 | Ochi et al. |
| 2017/0047614 A1 | 2/2017 | Sakai et al. |

(Continued)

FOREIGN PATENT DOCUMENTS

| CN | 105244458 A | 1/2016 |
| CN | 107004787 A | 8/2017 |

(Continued)

OTHER PUBLICATIONS

Machine Translation of WO 2020140334A1 (Year: 2020).*
(Continued)

*Primary Examiner* — Gregg Cantelmo
(74) *Attorney, Agent, or Firm* — K&L Gates LLP

(57) ABSTRACT

An insulation tape, a battery unit, a battery, a method and apparatus for preparing a battery unit, and a power consuming apparatus are provided. In some embodiments, the insulation tape includes a bottom surface coverage area, and a plurality of first side surface coverage areas and a plurality of second side surface coverage areas which are alternately arranged. Each of edges of the bottom surface coverage area is connected to one of the first side surface coverage areas or one of the second side surface coverage areas; each of the first side surface coverage areas includes a bottom covering portion and two side surface overlapping portions, a bottom edge of the bottom covering portion being connected to one of the edges of the bottom surface coverage area.

19 Claims, 6 Drawing Sheets

(51) Int. Cl.
*H01M 50/121* (2021.01)
*H01M 50/124* (2021.01)
*H01M 50/141* (2021.01)
*H01M 50/209* (2021.01)
*H01M 50/231* (2021.01)

(52) U.S. Cl.
CPC ..... *H01M 50/1245* (2021.01); *H01M 50/141* (2021.01); *H01M 50/209* (2021.01); *H01M 50/231* (2021.01); *H01M 2220/20* (2013.01)

(56) References Cited

U.S. PATENT DOCUMENTS

2017/0149030 A1* 5/2017 Lee ................. H01M 50/55
2017/0250388 A1* 8/2017 Unno ............... H01M 50/141

FOREIGN PATENT DOCUMENTS

| CN | 206388740 | U |   | 8/2017 |   |
|----|-----------|---|---|--------|---|
| CN | 112259837 | A |   | 1/2021 |   |
| CN | 215869570 | U | * | 2/2022 |   |
| EP | 2315300   | B1|   | 7/2017 |   |
| JP | 2003017020| A |   | 1/2003 |   |
| JP | 2012186005| A |   | 9/2012 |   |
| JP | 2013033668| A |   | 2/2013 |   |
| JP | 6092108   | B2|   | 3/2017 |   |
| JP | 6292011   | B2|   | 3/2018 |   |
| JP | 6314086   | B2|   | 4/2018 |   |
| JP | 2019117740| A |   | 7/2019 |   |
| JP | 2019192519| A |   | 10/2019|   |
| JP | 2020202089| A |   | 12/2020|   |
| JP | 7596401   | B2|   | 12/2024|   |
| KR | 102271654 | B1|   | 7/2021 |   |
| WO | 2013111256| A1|   | 8/2013 |   |
| WO | WO-2020140334 | A1 | * | 7/2020 | .......... H01M 50/289 |

OTHER PUBLICATIONS

Machine Translation of CN-215869570-U (Year: 2022).*
The extended European search report received in the corresponding European Application 21937189.5, mailed on Jul. 16, 2024.
Notice of Reasons for Refusal received in the corresponding Japanese Application 2022-560333, mailed Jun. 4, 2024.
Notice of Grant of Utility Model Patent Rights received in the corresponding Chinese Application 202121718737.9, mailed Dec. 7, 2021.
Notice of Reasons for Refusal received in the corresponding Japanese Application 2022-560333, mailed Nov. 21, 2023.
International Search Report received in the corresponding International Application PCT/CN2021/108769, mailed Nov. 10, 2021.
Written Opinion received in the corresponding International Application PCT/CN2021/108769, mailed Nov. 10, 2021.
Office Action (with English Machine Translation), mailed Sep. 30, 2025, for corresponding Japanese Patent Application Serial No. 2024-205050.
Notice of Grant, mailed Oct. 16, 2025, for corresponding European Patent Application Serial No. 21937189.5.

* cited by examiner

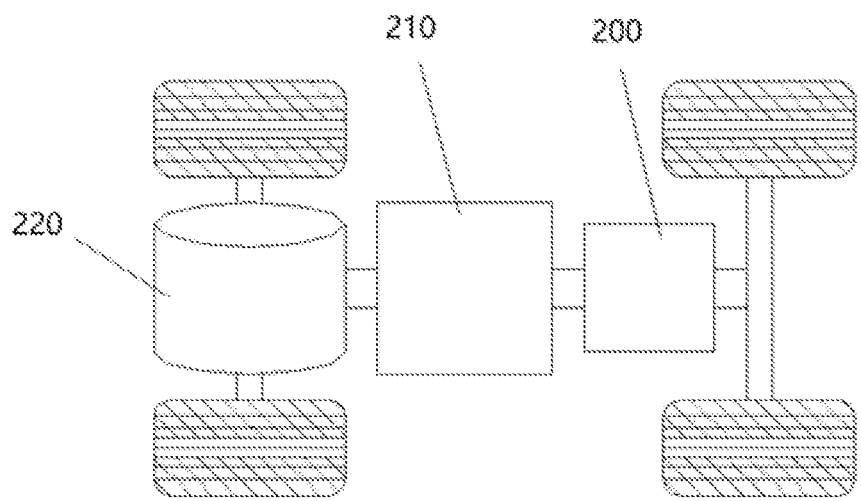
FIG. 1-A
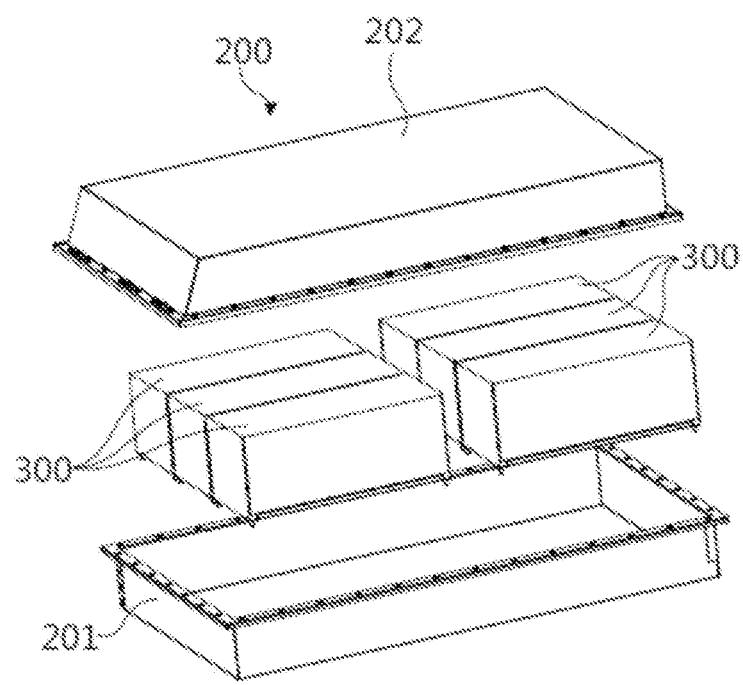
FIG. 1-B

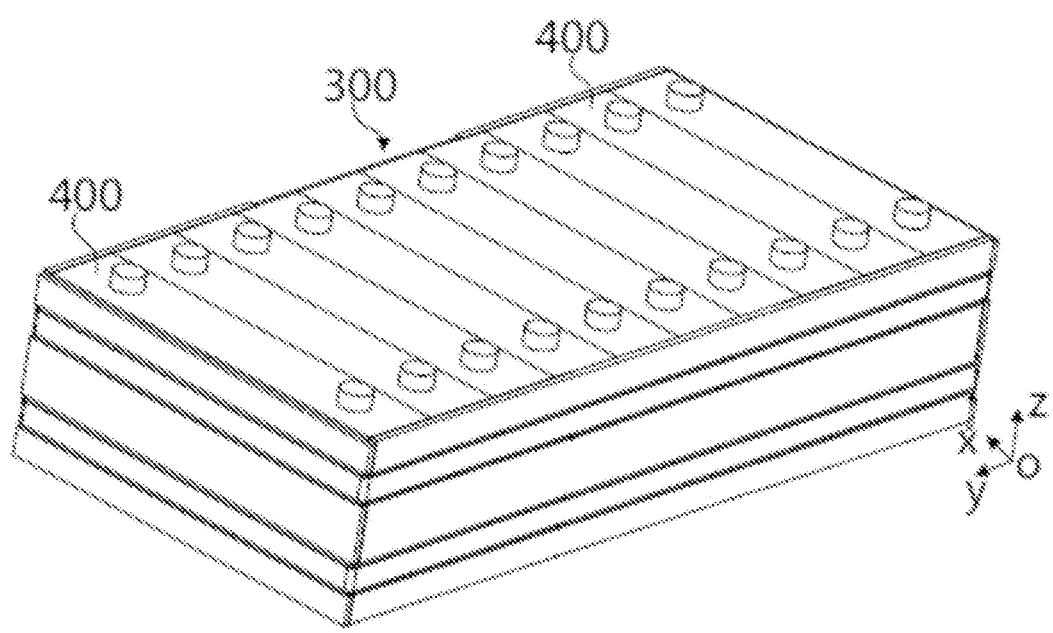
FIG. 1-C

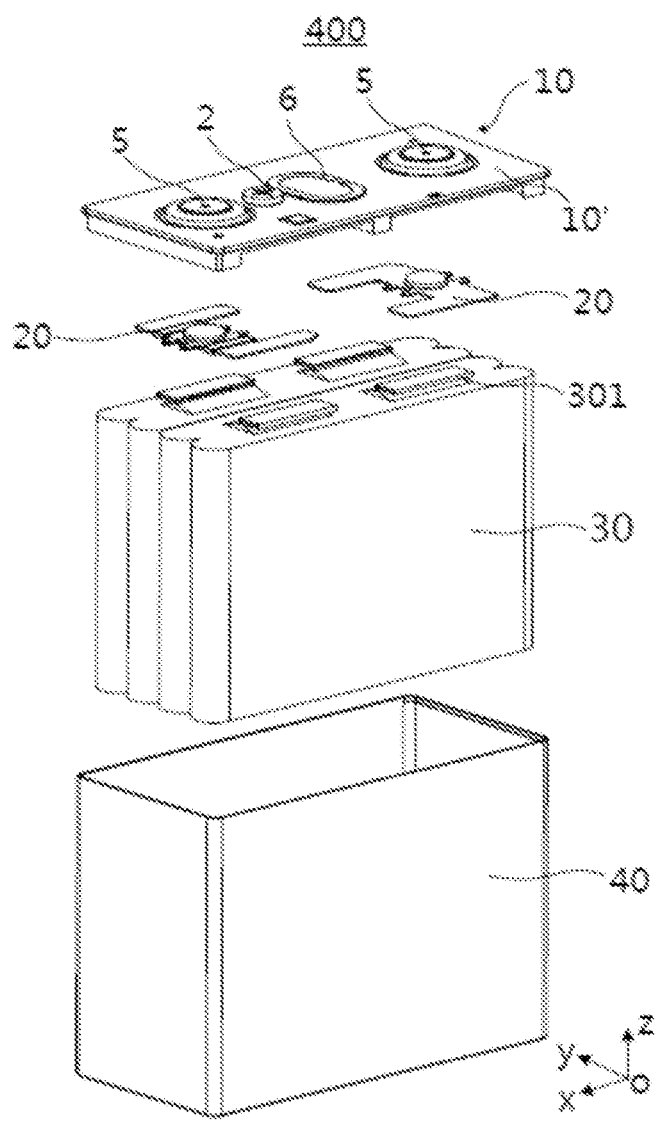
FIG. 1-D

INSULATION TAPE, BATTERY UNIT, BATTERY AND POWER CONSUMING APPARATUS

CROSS-REFERENCE TO RELATED APPLICATIONS

This application is a continuation of International Application No. PCT/CN2021/108769, filed Jul. 27, 2021, and entitled "INSULATION TAPE, BATTERY UNIT, BATTERY AND POWER CONSUMING APPARATUS", which is incorporated herein by reference in its entirety.

TECHNICAL FIELD

The present application relates to the technical field of batteries, and in particular to an insulation tape, a battery unit, a battery, a method and apparatus for preparing a battery unit, and a power consuming apparatus.

BACKGROUND ART

With the increasing aggravation of environmental pollution, the new energy industry has taken a growing interest, and rechargeable lithium ion secondary batteries have become a vital component of a wide range of electronic products, energy storage products and electric vehicles. Thus, the battery's performance will have a direct impact on popularization and application of related products.

For lithium ion batteries, in order to prevent water vapor from permeating into a battery unit, the battery unit is generally wrapped with a laminate material formed by combining one layer of metal and two layers of plastic.

However, such a way of wrapping the battery unit generally cannot protect the battery from water in the height direction, resulting in poor waterproofness of the lithium battery.

SUMMARY OF THE INVENTION

The present application provides a battery, a power consuming device, and a method and device for preparing a battery, which can reduce safety accidents caused by thermal runaway of the battery.

A first aspect of the present application provides an insulation tape. The insulation tape includes a bottom surface coverage area, and a plurality of first side surface coverage areas and a plurality of second side surface coverage areas which are alternately arranged. The total number of the first side surface coverage areas and the second side surface coverage areas is equal to the number of edges of the bottom surface coverage area, and each of the edges of the bottom surface coverage area is connected to one of the first side surface coverage areas or one of the second side surface coverage areas, wherein each of the first side surface coverage areas includes a bottom covering portion and two side surface overlapping portions, a bottom edge of the bottom covering portion being connected to one of the edges of the bottom surface coverage area, and the two side surface overlapping portions being respectively connected to the two second side surface coverage areas on two sides of the first side surface coverage area; and the bottom covering portions of the plurality of first side surface coverage areas and the second side surface coverage areas are all located on the same side of the bottom surface coverage area, so as to form an accommodation space, and the two side surface overlapping portions are arranged on the bottom covering portion in an overlapping manner, so as to seal the bottom of the accommodation space.

The first side surface coverage areas each including a bottom covering portion and two side surface overlapping portions and the second side surface coverage areas are alternately arranged on the same side of the bottom surface coverage area, and the bottom covering portion and the adjacent second side surface coverage areas are combined with the bottom surface coverage area to form the accommodation space for accommodating a battery unit. In addition, the two side surface overlapping portions are arranged on the bottom covering portion in an overlapping manner, and the two side surface overlapping portions are respectively connected to the adjacent second side surface coverage areas, thereby achieving a sealing effect on the accommodation space, further improving the waterproofness of the insulation tape, and achieving a waterproof effect of the battery.

In some embodiments, two side edges of the bottom covering portion are respectively connected to the two side surface overlapping portions.

The two side edges of the bottom covering portion are respectively connected to the two side surface overlapping portions, such that all parts of the insulation tape can be connected into a whole, thereby further improving the sealing performance of the accommodation space delimited by the insulation tape.

In some embodiments, the bottom covering portion includes a middle area, and a first side edge area and a second side edge area which are connected to two sides of the middle area, a side edge of the first side edge area being connected to one of the side surface overlapping portions, and a side edge of the second side edge area being connected to the other side surface overlapping portion; and the first side edge area, the side surface overlapping portion connected to the first side edge area, the second side edge area and the side surface overlapping portion connected to the second side edge area are all arranged on the middle area in an overlapping manner.

The side edge of the first side edge area is connected to one of the side surface overlapping portions, and the side edge of the second side edge area is connected to the other side surface overlapping portion, such that the bottom covering portion and the two side surface overlapping portions can be connected into a whole to improve the sealing performance of the structure. Moreover, the first side edge area, the second side edge area and the side surface overlapping portions are arranged on the middle area in an overlapping manner, thereby improving the compactness of the structure, and ensuring the shape of the accommodation space matching the battery.

In some embodiments, the side surface overlapping portion includes an upper area and a lower area which are connected to each other, wherein the lower area covers the whole first side edge area or the whole second side edge area;

or the lower area covers part of the first side edge area or part of the second side edge area, and the remaining part of the first side edge area or the remaining part of the second side edge area is covered by the upper area.

Part of the first side edge area or part of the second side edge area is covered by the lower area, and the remaining part of the first side edge area or the remaining part of the second side edge area is covered by the upper area, such that outer sides of the first side edge area and the second side edge area are further provided with the side surface overlapping portions, and adhesive structures on the side surface overlapping portions can provide the function of fixing the side surface overlapping portions to the middle area, thereby improving the firmness of the overlapped structure, and further improving the sealing performance of the insulation tape.

In some embodiments, the upper area, the lower area and the adjacent second side surface coverage area are connected into a whole.

In some embodiments, edges of the upper area and the lower area that are connected to the second side surface coverage area have a total length the same as a length of a corresponding edge of the second side surface coverage area, and are connected to the corresponding edge of the second side surface coverage area in an aligned manner.

By means of the integrated connection and the total length being equal to the length of a corresponding edge, it is possible to avoid a gap between the side surface overlapping portion and the second side surface coverage area, achieving a waterproof effect.

In some embodiments, the upper area is rectangular, the lower area is triangular, and the edge of the upper area connected to the lower area has a length greater than or equal to that of the edge of the lower area connected to the upper area.

In some embodiments, a distance between the edge of the side surface overlapping portion away from the second side surface coverage area connected thereto and the other second side surface coverage area is less than a first preset distance, so as to ensure that a gap is reserved between the side surface overlapping portion and the other second side surface coverage area, facilitating overlapping and later sealing the whole first side surface coverage area with an adhesive.

In some embodiments, the bottom edge of the bottom covering portion and a corresponding edge of the bottom surface coverage area have the same length and are connected to each other in an aligned manner.

It is thus possible to avoid a gap between the bottom covering portion and the bottom surface coverage area to a certain extent, achieving a waterproof effect.

In some embodiments, the bottom of the first side surface coverage area is coated with a first adhesive structure, a bottom edge of the first adhesive structure is flush with a bottom edge of the first side surface coverage area, and a second preset distance is reserved between a side edge of the first adhesive structure and a side edge of the first side surface coverage area.

The first adhesive structure is used for achieving the purpose of further sealing a bottom area of the insulation tape.

In some embodiments, the first adhesive structure has a height greater than that of the bottom covering portion, so as to ensure that the first adhesive structure can seal the bottom covering portion. In this way, the first adhesive structure achieves the purpose of further sealing a bottom area of the insulation tape.

In some embodiments, the accommodation space is configured to wrap a cell or a battery module.

In some embodiments, an inner wall of the accommodation space is connected to the cell or the battery module in a bonded manner.

It is necessary to connect the inner wall of the accommodation space in the insulation tape to the battery module in a bonded manner, thereby relatively fixing the insulation tape to the battery module.

In some embodiments, the insulation tape is made of a waterproof material.

According to a second aspect of the present application, provided is a battery unit, including a cell and the insulation tape described above, wherein the cell is provided with a housing, a bottom wall of the housing is covered by the bottom surface coverage area of the insulation tape, and side walls of the housing are covered by the first side surface coverage areas and the second side surface coverage areas of the insulation tape, so as to at least partially wrap the cell in the accommodation space of the insulation tape.

According to a third aspect of the present application, provided is a battery, including a plurality of battery units described above.

According to a fourth aspect of the present application, provided is a battery, including the insulation tape described above and a plurality of cells, wherein the plurality of cells are wrapped in the accommodation space of the insulation tape; and each first side surface coverage area of the insulation tape for wrapping the cells is coated with a second adhesive structure configured to be connected to an adjacent cell.

In some embodiments, in a height direction of the battery unit, the second adhesive structure is located above the first adhesive structure of the insulation tape, and the second adhesive structure and the first adhesive structure are spaced apart by a preset distance.

In some embodiments, the second adhesive structure has a viscosity greater than that of the first adhesive structure, and the second adhesive structure has a waterproofness lower than that of the first adhesive structure.

In some embodiments, the second adhesive structure has a thickness greater than that of the first adhesive structure.

According to a fifth aspect of the present application, provided is a method for preparing a battery unit, the method including:

providing a cell, the cell having a housing; and providing the insulation tape described above, the insulation tape being configured to wrap the housing, wherein the bottom surface coverage area of the insulation tape covers a bottom wall of the housing, and the first side surface coverage areas and the second side surface coverage areas of the insulation tape cover side walls of the housing, so as to at least partially wrap the housing in the accommodation space of the insulation tape.

According to a sixth aspect of the present application, provided is an apparatus for preparing a battery unit, the apparatus including:

a first device for providing a cell, the cell having a housing; and a second device for providing the insulation tape described above, the insulation tape being configured to wrap the housing, wherein the bottom surface coverage area of the insulation tape covers a bottom wall of the housing, and the first side surface coverage areas and the second side surface coverage areas of the insulation tape cover side walls of the housing, so as to at least partially wrap the housing in the accommodation space of the insulation tape.

According to a seventh aspect of the present application, provided is a power consuming apparatus, including: the battery described above.

BRIEF DESCRIPTION OF THE DRAWINGS

In order to more clearly illustrate the technical solutions in the embodiments of the present application or in the prior art, the drawings to be used in the description of the embodiments of the present application or the prior art will be described briefly below. Obviously, the drawings in the following description are merely some embodiments of the present application. For those of ordinary skill in the art, other drawings can also be obtained according to these drawings without involving any inventive effort.

The accompanying drawing described herein is intended to provide a further understanding of the present application, which constitutes a part of the present application. The exemplary embodiments of the present application and the description thereof are intended to explain the present application and do not constitute an undue limitation of the present application.

FIG. 1-A is a schematic structural diagram of a power consuming device of an embodiment of the present application.

FIG. 1-B is a schematic structural diagram of a battery of an embodiment of the present application.

FIG. 1-C is a schematic structural diagram of a battery module of an embodiment of the present application.

FIG. 1-D is a schematic structural diagram of a battery unit of an embodiment of the present application.

DETAILED DESCRIPTION OF EMBODIMENTS

Figure 2:
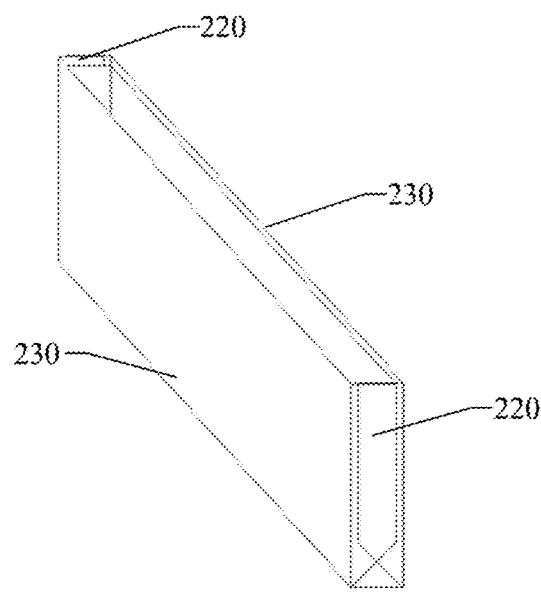
FIG. 2 is a schematic structural diagram of an insulation tape of an embodiment of the present application.

In order to make the objective, technical solutions, and advantages of the present application clearer, the present application is described in further detail below with reference to the drawings and embodiments. It should be understood that particular embodiments described herein are merely used to explain the present application, which are preferred embodiments of the present application, and do not limit the scope of protection of the present application accordingly. Therefore, any equivalent changes made according to the structure, shape and principle of the present application shall fall within the scope of protection of the present application.

Unless otherwise defined, all technological and scientific terms used herein have the same meanings as those generally understood by those skilled in the art to which the present application belongs. The terms used in the description of the present application herein are merely for the purpose of describing specific embodiments, but are not intended to limit the present application. The terms "including" and "having" and any variations thereof in the description and the claims of the present application as well as the brief description of the drawings described above are intended to cover non-exclusive inclusion.

The phrase "embodiment" mentioned to herein means that the specific features, structures and characteristics described in conjunction with the embodiment may be included in at least one of the embodiments of the present application. The phrase "embodiment" in various places in the description does not necessarily refer to the same embodiment, nor is it an independent or alternative embodiment exclusive of other embodiments. Those skilled in the art understand explicitly or implicitly that an embodiment described herein may be combined with another embodiment.

The term "and/or" herein is merely a description of the associated relationship of associated objects, and indicates that three relationships may exist. For example, A and/or B may indicate that A exists alone, both A and B exist, and B exists alone. In addition, the character "/" herein generally indicates an "or" relationship between the associated objects.

In addition, the terms "first", "second" and the like in the description and the claims of the present application or in the above drawings are used to distinguish different objects, rather than to describe a specific order. Therefore, a feature defined by "first" or "second" may explicitly or implicitly include one or more features.

In the description of the present application, "plurality of" means at least two (including two), and similarly, "plurality of groups" means at least two groups (including two groups).

In the description of the present application, it should be noted that unless otherwise explicitly specified and defined, the terms "mounting", "connecting" and "connection" should be understood in a broad sense. For example, "connecting" or "connection" of mechanical structures may be a physical connection. For example, the physical connection may be a fixed connection, such as a fixed connection by means of a fixing member, for example, a fixed connection by means of a screw, a bolt or other fixing members; or the physical connection may be a detachable connection, for example, a mutual snap connection or a snap-fit connection; or the physical connection may be an integral connection, for example, a connection formed by welding, bonding or integral molding. "Connecting" or "connection" of a circuit structure may be not only a physical connection, but also an electrical connection or a signal connection, for example; or may be a direct connection, that is, physical connection, or an indirect connection by means of at least one intermediate element as long as the circuit operates; or may be internal communication between two elements. The signal connection may not only a signal connection by means of a circuit, but also a signal connection by means of a media medium, such as radio waves. For those of ordinary skill in the art, the specific meaning of the above terms in the embodiments of the present application can be understood according to specific situations.

In order to clearly describe each orientation in the following embodiments, some orientation words may be used. For example, a coordinate system in FIG. 1-D defines each of orientation directions of a battery. An x-direction represents a length direction of a battery unit 400, a y-direction is perpendicular to the x-direction in a horizontal plane, and represents a width direction of the battery unit 400, and a z-direction is perpendicular to the x-direction and y-direction, and represents a height direction of the battery. In addition, expressions indicating directions, such as the x-direction, the y-direction and the z-direction, which are used for describing the operations and configurations of members of a battery of this embodiment, are not absolute but rather relative, and although these indications are appropriate when the members of the battery are in positions shown in the figures, these directions should be interpreted differently when these positions are changed in order to correspond to the changes.

On the basis of the same understanding of orientations, that in the description of the present application, the orientation or positional relationships indicated by the technical terms "central", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "circumferential", etc. are based on the orientation or positional relationships shown in the accompanying drawings and are only for facilitating the description of the present application and simplifying the description, rather than indicating or implying that the apparatus or element referred to must have a particular orientation or be constructed and operated in a particular orientation, and therefore will not be interpreted as limiting the present application.

Rechargeable batteries may be referred to as secondary batteries or traction batteries. At present, the widely-used rechargeable batteries are lithium batteries, such as lithium-sulfur batteries, sodium/lithium ion batteries, or magnesium ion batteries, but are not limited thereto. The rechargeable batteries may be collectively referred to as batteries herein for convenience of description.

A safety characteristic of the battery is a vital characteristic for evaluating the battery, and it is necessary to ensure the safety of the battery as much as possible when the battery is being used or charged.

The battery is generally formed by connecting and combining a plurality of battery units, and when external short circuit, overcharge, acupuncture, plate impact, etc. happen to a battery unit, the battery unit is prone to thermal runaway. When thermal runaway happens to the battery unit, emissions are generated inside the battery unit. The emissions include substances such as high-temperature flue gas (in severe cases, open flames) and volatile high-temperature electrolyte, and thermal diffusion happens to the emissions in the emission process, thereby leading to thermal runaway, even accidents such as explosion, of other battery units. It can be understood that the emissions from the battery unit mentioned in the present application include, but are not limited to: an electrolyte, dissolved or split positive and negative electrode plates, fragments of a separator, high-temperature and high-pressure gas generated by reaction, flames, etc.

The inventor(s) have found that when thermal runaway happens to a certain battery unit, the problem of short circuit, high-voltage ignition, etc. of the surrounding battery units may be caused.

Aiming at this problem, the inventors performs insulation treatment on a plurality of parts inside the battery, however, the problem of short circuit, high-voltage ignition, etc. when thermal runaway happens to the battery unit is still not solved. Through further research, the applicants have found that the problem of short circuit, high-voltage ignition, etc. with the thermal runaway of the battery unit is caused by contact between the emissions discharged from the interior of the battery and a busbar component.

In view of this, the present disclosure aims to provide a battery, which can prevent high-temperature emissions ejected from a battery unit subjected to thermal runaway from sputtering onto a busbar component, and reduce the problems of short circuit and high-voltage ignition of the battery unit. Therefore, the battery of the present application can not only control a condition of thermal runaway of the battery unit in a timely manner to prevent the battery unit from further generating heat and high-temperature emissions, but can also prevent the high-temperature emissions from splashing to the busbar component to reduce conditions of short circuit and high-voltage ignition of the battery unit.

The battery in one embodiment in accordance with the present disclosure may be applied to various power consuming devices capable of being powered by electric energy. The power consuming device herein may be, but not limited to, an electric vehicle, an electric train, an electric bicycle, a golf cart, an unmanned aerial vehicle or a steamship. Moreover, the power consuming device may be a device which is only powered by a battery, or may be a hybrid device. The battery supplies electric energy to the power consuming device, and an electric device is driven by an electric motor to move.

For example, as shown in FIG. 1-A, which is a schematic structural diagram of a power consuming device according to an embodiment of the present application. The power consuming device may be a vehicle, which may be a fuel vehicle, a gas vehicle or a new-energy vehicle. The new-energy vehicle may be a battery electric vehicle, a hybrid vehicle, an extended-range vehicle, etc. The vehicle includes a battery 200, a controller 210 and a motor 220. The battery 200 is configured to supply power to the controller 210 and the motor 220 as an operating power supply and a driving power supply of the vehicle. For example, the battery 200 is used for meeting the working power requirements of the vehicle during starting, navigating and running. For example, the battery 200 supplies power to the controller 210, the controller 210 controls the battery 200 to supply power to the motor 220, and the motor 220 receives and uses the power from the battery 200 as the driving power of the vehicle, replacing or partially replacing the driving power provided by the fuel or natural gas for the vehicle.

In order to make the battery achieve a high function to satisfy use requirements, the battery 200 may include a plurality of battery modules connected to one another. As shown in FIG. 1-B, the battery 200 includes a first housing 201, a second housing 202, and a plurality of battery modules 300. The first housing 201 is snap-fitted to the second housing 202, and the plurality of battery modules 300 are arranged in a space enclosed by the first housing 201 and the second housing 202.

As shown in FIG. 1-C, the battery module 300 includes a plurality of battery units 400. The plurality of battery units 400 may be in series connection, parallel connection or series-parallel connection to achieve a large current or voltage. The series-parallel connection refers to a combination of series connection and parallel connection. With continued reference to FIG. 1-C, the battery units 400 may be placed upright, a height direction of the battery units 400 is consist with a z-direction, a length direction of the battery units 400 is consist with an x-direction, and a plurality of battery units 400 are arranged side-by-side in a y-direction, i.e. in a width direction of the battery units. Alternatively, the battery units 400 may be placed flat, the width direction of the battery units 400 is consist with the z-direction, the length direction of the battery units 400 is consist with the x-direction, the plurality of battery units 400 may be stacked into at least one layer in the z-direction, and each layer includes a plurality of battery units 400 arranged at intervals in the x-direction.

The overall structure of the battery unit 400 is first described in order to make those skilled in the art clearly understand the point of improvement of the present application.

As shown in FIG. 1-D, the battery unit 400 includes a cell. The cell includes a housing 40, an electrode assembly 30, and an end cap assembly 10. The end cap assembly 10 includes an end cap plate 10', the end cap plate 10' is connected (e.g., welded) to the housing 40 to form a shell of the battery unit 400, the electrode assembly 30 is arranged in the housing 40, and the housing 40 is filled with an electrolyte. The battery unit 400 may be in the shape of a cube, a cuboid, or a cylinder.

One or more electrode assemblies 30 may be arranged according to actual use requirements. As shown in FIG. 1-D, it is also possible to provide at least two independently wound electrode assemblies 30 in the battery. A main body portion of the electrode assembly 30 may be formed by winding or laminating a first electrode plate, a second electrode plate, and a separator located between the first electrode plate and the second electrode plate which are adjacent to each other together. The separator is an insulator interposed between the first electrode plate and the second electrode plate which are adjacent to each other. The main body portion is provided with two opposite end faces. In this embodiment, the first electrode plate will be exemplarily described as a positive electrode plate and the second electrode plate as a negative electrode plate. A coated area of the positive electrode plate is coated with a positive active material, and a coated area of the negative electrode plate is coated with a negative active material. A plurality of uncoated areas extending from the coated areas of the main body portion overlap one another to form tabs. The electrode assembly includes two tabs 301, i.e., a positive tab and a negative tab. The positive tab extends out of the coated area of the positive electrode plate, and the negative tab extends out of the coated area of the negative electrode plate.

The end cap assembly 10 is arranged at the top of the electrode assembly 30. As shown in FIG. 1-D, the end cap assembly 10 includes an end cap plate 10' and two electrode terminals 5. The two electrode terminals 5 are a positive terminal and a negative terminal respectively, each of the electrode terminals 5 is correspondingly provided with one connection member 20, and the connection member 20 is located between the end cap 10' and the electrode assembly 30.

For example, the tab 301 of the electrode assembly 30 in FIG. 1-D is located at the top, the positive tab is connected to the positive terminal via one of the connection members 20, and the negative tab is connected to the negative terminal via the other connection member 20. Optionally, the battery unit 400 may include two end cap assemblies 10 arranged at two ends of the housing 40 respectively, with one terminal 5 arranged on each of the end cap assemblies 10.

An explosion-proof member may be further arranged on the end cap plate 10', such that when gas in the battery unit 400 is too much, the gas in the battery unit 400 is released in a timely manner, and explosion is avoided.

An exhaust hole is provided in the end cap plate 10', and may be provided in a middle of the end cap 10' in a length direction thereof. The explosion-proof member includes a pressure relief mechanism 6. The pressure relief mechanism 6 is arranged on the exhaust hole. In a normal state, the pressure relief mechanism 6 is mounted on the exhaust hole in a sealed manner, and when the battery expands to rise gas pressure in the shell to exceed a preset value, the pressure relief mechanism 6 is actuated to be opened, and the gas is released outwardly by means of the pressure relief mechanism 6.

In some embodiments, as shown in FIG. 1-D, a through hole for injecting an electrolyte into the cell 400 is provided in the end cap plate 10', may use a circular hole, an elliptical hole, a polygonal hole, or a hole having another shape, and may extend in a height direction of the end cap plate 10'. A liquid injection member 2 for sealing the through hole is arranged on the end cap plate 10'.

Figure 3:
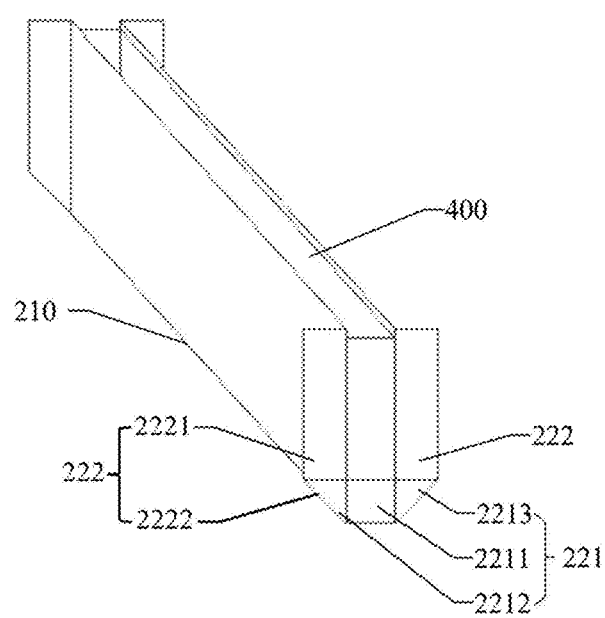
FIG. 3 is a schematic structural diagram of a first side surface coverage area of an insulation tape of an embodiment of the present application.

As shown in FIGS. 2 and 3, an embodiment of the present application provides an insulation tape, which is configured to wrap a cell 400. The insulation tape includes a bottom surface coverage area 210 and a plurality of first side surface coverage areas 220 and a plurality of second side surface coverage areas 230 which are alternately arranged. The bottom surface coverage area 210 is configured to cover a bottom of the cell 400; and the plurality of first side surface coverage areas 220 and the plurality of second side surface coverage areas 230 that are alternately arranged are configured to cover side surfaces of the cell 400. The total number of the first side surface coverage areas 220 and the second side surface coverage areas 230 is equal to the number of edges of the bottom surface coverage area 210, and each of the edges of the bottom surface coverage area 210 is connected to one of the first side surface coverage areas 220 or one of the second side surface coverage areas 230, thereby ensuring that the bottom surface coverage area 210 can be substantially seamlessly connected to the first side surface coverage areas 220 and the second side surface coverage areas 230.

In an embodiment of the present application, the plurality of first side surface coverage areas 220 and the plurality of second side surface coverage areas 230 are all located on the same side of the bottom surface coverage area 210, so as to form an accommodation space. As shown in FIG. 2, the accommodation space is configured to accommodate the cell 400.

In one embodiment, the first side surface coverage area 220 includes a bottom covering portion 221 and two side surface overlapping portions 222. A bottom edge of the bottom covering portion 221 is connected to one of the edges of the bottom surface coverage area 210, so as to connect the bottom surface coverage area 210 to the first side surface coverage area 220; and the two side surface overlapping portions 222 are respectively connected to the two second side surface coverage areas 230 on two sides of the first side surface coverage area 220, so as to connect the first side surface coverage area 220 to the second side surface coverage areas 230.

Further, the bottom covering portions 221 of the plurality of first side surface coverage areas 220 and the second side surface coverage areas 230 are all located on the same side of the bottom surface coverage area 210 to form the accommodation space, and the two side surface overlapping portions 222 are arranged on the bottom covering portion 221 in an overlapping manner, so as to seal the bottom of the accommodation space, so that a waterproof effect can be provided.

For the insulation tape provided an the embodiment of the present application, the first side surface coverage areas 220 each including a bottom covering portion 221 and two side surface overlapping portions 222 and the second side surface coverage areas 230 are alternately arranged on the same side of the bottom surface coverage area 210, and the bottom covering portion 221 and the adjacent second side surface coverage areas 230 are combined with the bottom surface coverage area 210 to form the accommodation space for accommodating the cell. In addition, the two side surface overlapping portions 222 are arranged on the bottom covering portion 221 in an overlapping manner, and the two side surface overlapping portions 222 are respectively connected to the adjacent second side surface coverage areas 230, thereby achieving a sealing effect on the accommodation space, further improving the waterproofness of the insulation tape, and achieving a waterproof effect of the cell.

In practical applications, the connection mode and the overlapping mode may be determined according to actual situations. For example, the bottom covering portion 221 and the second side surface coverage area 230 are each connected to the bottom surface coverage area 210 into a whole, and the side surface overlapping portion 222 is connected to the second side surface coverage area 230 into a whole. In addition, an adhesive structure may be provided on the surface of the side surface overlapping portion 222 that is arranged on the bottom covering portion 221 in an overlapping manner, such that the side surface overlapping portion may be arranged on the bottom covering portion 221 in an adhesively bonded and overlapping manner.

In an embodiment of the present application, in order to conveniently fix the cell in the accommodation space of the insulation tape, an adhesive structure may be provided on the side of the insulation tape close to the accommodation space, thereby bonding the insulation tape to the cell. Certainly, any other means capable of fixedly connecting the cell to the insulation tape fall within the scope of protection of the present application.

In an embodiment of the present application, two side edges of the bottom covering portion 221 are respectively connected to the two side surface overlapping portions 222, such that all parts of the insulation tape can be connected into a whole, thereby further improving the sealing performance of the accommodation space delimited by the insulation tape.

With reference to FIG. 3, the bottom covering portion 221 includes a middle area 2211, and a first side edge area 2212 and a second side edge area 2213 which are connected to two sides of the middle area 2211. A side edge of the first side edge area 2212 is connected to one of the side surface overlapping portions 222, and a side edge of the second side edge area 2213 is connected to the other side surface overlapping portion 222. The first side edge area 2212, the side surface overlapping portion 222 connected to the first side edge area 2212, the second side edge area 2213 and the side surface overlapping portion 222 connected to the second side edge area 2213 are all arranged on the middle area 2211 in an overlapping manner.

The side edge of the first side edge area 2212 is connected to one of the side surface overlapping portions 222, and the side edge of the second side edge area 2213 is connected to the other side surface overlapping portion 222, such that the bottom covering portion 221 and the two side surface overlapping portions 222 can be connected into a whole to improve the sealing performance of the structure. Moreover, the first side edge area 2212, the second side edge area 2213 and the side surface overlapping portions 222 are arranged on the middle area 2211 in an overlapping manner, thereby improving the compactness of the structure, and ensuring the shape of the accommodation space matching the cell.

In addition, one side of each of the middle area 2211 and the side surface overlapping portions 222 close to the cell is coated with an adhesive structure, such that the above overlapped structure can be fixed to the cell, so as to achieve the fixing and sealing purposes.

Figure 4:
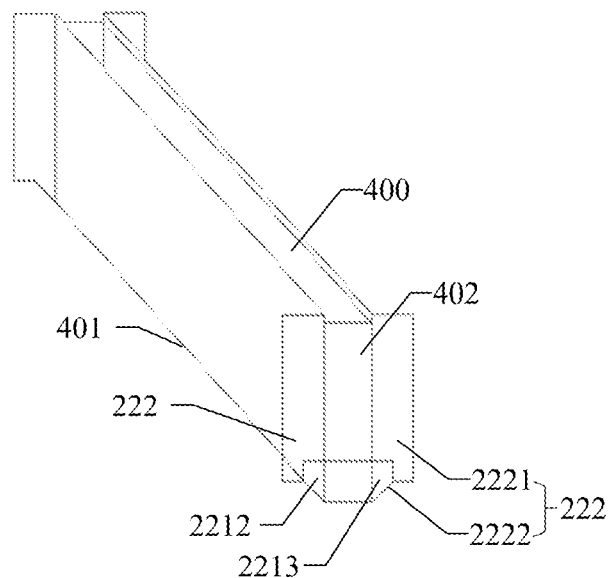
FIG. 4 is a schematic structural diagram of another first side surface coverage area of an embodiment of the present application.

In practical applications, the specific structural forms of the bottom covering portion 221 and the side surface overlapping portions 222 may be configured according to actual requirements, and an embodiment of the present application further provides a schematic structural diagram of another insulation tape as shown in FIG. 4 in addition to the insulation tape structure shown in FIG. 3.

In the insulation tape provided in FIGS. 3-4, the side surface overlapping portion 222 includes an upper area 2221 and a lower area 2222 which are connected to each other. The lower area 2222 covers part of the first side edge area 2212 or part of the second side edge area 2213, and the remaining part of the first side edge area 2212 or the remaining part of the second side edge area 2213 is covered by the upper area 2221.

In the insulation tape provided in FIG. 3, the lower area 2222 covers the whole first side edge area 2212 or the whole second side edge area 2213.

Compared with the insulation tape structure shown in FIG. 3, in the insulation tape provided in FIG. 4, outer sides of the first side edge area 2212 and the second side edge area 2213 are further provided with the side surface overlapping portions 222, and adhesive structures on the side surface overlapping portions 222 can provide the function of fixing the side surface overlapping portions 222 to the middle area 2211, thereby improving the firmness of the overlapped structure, and further improving the sealing performance of the insulation tape.

In order to improve the waterproofness of the insulation tape, and to ensure integration of the components of the insulation tape, the upper area 2221, the lower area 2222 and the adjacent second side surface coverage area 230 are connected into a whole. Edges of the upper area 2221 and the lower area 2222 that are connected to the second side surface coverage area 230 have a total length the same as a length of a corresponding edge of the second side surface coverage area 230, and are connected to the corresponding edge of the second side surface coverage area in an aligned manner. It is thus possible to avoid a gap between the side surface overlapping portion 222 and the second side surface coverage area 230, achieving a waterproof effect. The integrated connection may be adhesive connection or integrated molding, and will not be specially defined in the embodiments of the present application.

In an optional implementation of the embodiment of the present application, the upper area 2221 may be rectangular, the lower area 2222 may be triangular, and the edge of the upper area 2221 connected to the lower area 2222 has a length greater than or equal to that of the edge of the lower area 2222 connected to the upper area 2221. FIG. 3 shows a situation in which connection edges of the upper area 2221 and the lower area 2222 have the same length, and FIG. 4 shows a situation in which at the connection, the edge of the upper area 2221 has a length greater than that of the edge of the lower area 2222.

It should be noted that the upper area 2221 and the lower area 2222 may alternatively have other structural forms besides the structural forms described above, such as trapezoid and polygon, and different structural forms may be provided according to actual situations and requirements, and will not be specially defined in the embodiments of the present application.

Figure 5:
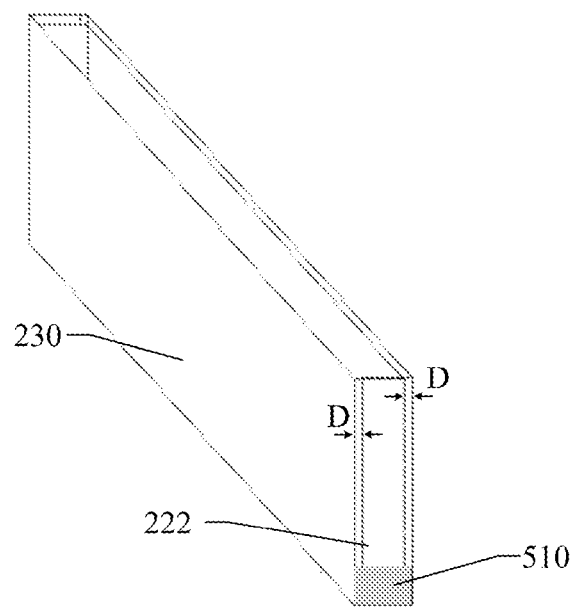
FIG. 5 is a schematic structural diagram of an insulation tape provided with a first adhesive structure of an embodiment of the present application.

With reference to FIG. 5, a distance D between the edge of the side surface overlapping portion 222 away from the second side surface coverage area 230 connected thereto and the other second side surface coverage area 230 is less than a first preset distance, so as to ensure that a gap is reserved between the side surface overlapping portion 222 and the other second side surface coverage area 230, facilitating overlapping and later sealing the whole first side surface coverage area 220 with an adhesive.

In an embodiment of the present application, in order to further seal the overlapped structure, as shown in FIG. 5, the bottom of the first side surface coverage area 220 is coated with a first adhesive structure 510, a bottom edge of the first adhesive structure 510 is flush with a bottom edge of the first side surface coverage area 220, and a second preset distance is reserved between a side edge of the first adhesive structure 510 and a side edge of the first side surface coverage area 220. The second preset distance needs to be less than the first preset distance, so as to ensure that part of the first adhesive structure 510 covers the side edge of the side surface overlapping portion 222 and achieve the purpose of sealing the side surface overlapping portion 222.

In addition, the height of the first adhesive structure 510 needs to be greater than that of the bottom covering portion 221, so as to ensure that the first adhesive structure 510 can seal the bottom covering portion 221. In this way, the first adhesive structure 510 achieves the purpose of further sealing a bottom area of the insulation tape.

In an implementation of the embodiment of the present application, the first adhesive structure 510 may be made of:

Similarly, in order to improve the waterproofness of the insulation tape, and to ensure integration of the components of the insulation tape, the bottom edge of the bottom covering portion 221 and a corresponding edge of the bottom surface coverage area 210 have the same length and are connected to each other in an aligned manner. It is thus possible to avoid a gap between the bottom covering portion 221 and the bottom surface coverage area 210, achieving a waterproof effect.

In an embodiment of the present application, the insulation tape has a height greater than that of the cell 400. Specifically, the first side surface coverage area 220 and the second side surface coverage area 230 have a height greater than that of the cell 400 to achieve a waterproof effect of the whole cell 400 in the height direction thereof.

In practical applications, in addition to the connection between different parts of the insulation tape, it is necessary to connect an inner wall of the accommodation space in the insulation tape to the cell in a bonded manner, thereby relatively fixing the insulation tape to the cell. The specific bonding part and bonding method will not be specially defined in the embodiments of the present application.

In an embodiment of the present application, the accommodation space of the insulation tape may wrap a battery module 300 composed of a plurality of cells rather than a cell, and the plurality of cells may be connected in different manners.

In an actual situation where the battery module 300 is wrapped, the bottom surface coverage area 210 of the insulation tape covers the bottom of the battery module 300; and the plurality of first side surface coverage areas 220 and the plurality of second side surface coverage areas 230 cover side surfaces of the battery module 300, and the battery module 300 is wrapped in the accommodation space.

The specific structural form of the insulation tape is consistent with that of the insulation tape for wrapping the cell 400 and will not be described herein again. Moreover, it is necessary to connect the inner wall of the accommodation space in the insulation tape to the battery module 300 in a bonded manner, thereby relatively fixing the insulation tape to the battery module 300.

In the embodiments of the present application, both a waterproof effect and an insulating effect can be provided by wrapping the cell 400 or the battery module 300 with the insulation tape, the cost is low, and the occupied space is small.

It needs to be emphasized that the insulation tape is made of a waterproof material. For example, the insulation tape is formed by combining a matrix and an adhesive layer. The matrix may be made of a high polymer material such as polyethylene, polypropylene, polyethylene terephthalate, polyamide, styrene-propylene ester copolymer, polystyrene and polyamide; and the adhesive layer may be made of a high polymer material such as acrylate, epoxy resin, polyurethane, amino resin and phenolic resin.

In practical applications, the insulation tape may have a thickness ranging from 25 um to 400 um. Optionally, the matrix may have a thickness ranging from 20 um to 200 um, e.g. 50 um; and the adhesive layer may have a thickness ranging from 5 um to 200 um, e.g., 20 um.

In another aspect, an embodiment of the present application further provides a battery unit. The battery unit includes a cell and the insulation tape described above. As shown in FIG. 4, the cell 400 is provided with a housing, a bottom wall 401 of the housing is covered by the bottom surface coverage area of the insulation tape, and side walls 402 of the housing are covered by the first side surface coverage areas and the second side surface coverage areas of the insulation tape, so as to at least partially wrap the cell in the accommodation space of the insulation tape. The specific structural form and arrangement position of the insulation tape have been described in detail in the above embodiments, and will not be described again in this embodiment.

In still another aspect, the present application further provides a battery, including a plurality of battery units described above. The specific structural form of the battery unit have been described in detail in the above embodiments, and will not be described again in this embodiment.

To sum up, the battery provided in the embodiment of the present application is provided with the battery units described above, and the outsides of the cells in the battery units are wrapped with the insulation tape, such that an insulating effect is achieved, and a waterproof effect can also be achieved while short circuit of the cell is prevented.

In yet another aspect, the present application further provides a battery, including the insulation tape described above and a plurality of cells. The plurality of cells are wrapped in the accommodation space of the insulation tape, and the cells wrapped with the insulation tape are connected to one another.

Figure 6:
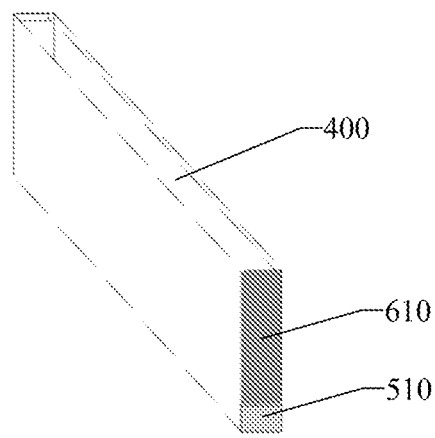
FIG. 6 is a schematic structural diagram of an insulation tape provided with a second adhesive structure of an embodiment of the present application.

With reference to FIG. 6, each first side surface coverage area of the insulation tape for wrapping the cells 400 is coated with a second adhesive structure 610. The second adhesive structure 610 is configured to be connected to an adjacent cell 400.

In a height direction of the cells 400, the second adhesive structure 610 is located above the first adhesive structure 510 of the insulation tape, and the second adhesive structure 610 and the first adhesive structure 510 are spaced apart by a preset distance, so as to avoid the situation that the second adhesive structure 610 having a high strength generates a tensile force on the first adhesive structure 510 to tear the first adhesive structure 510.

In an implementation of an embodiment of the present application, the second adhesive structure 610 has a viscosity greater than that of the first adhesive structure 510, and the second adhesive structure 610 has a waterproofness lower than that of the first adhesive structure 510. The first adhesive structure 510 mainly provides waterproof and sealing effects, and the second adhesive structure 610 mainly provides connection and fixation functions.

In an implementation of the embodiment of the present application, in order to test the waterproofness of the second adhesive structure 610, the battery is placed in a metal container containing 0.3% to 3.5% salt water, and the salt water has a level lower than the total height of the battery by 2 mm to 5 mm; and then, a multimeter may be used to measure a resistance of the battery, and if the measured resistance is greater than a preset threshold, such as 1 Mohm, it is determined that the second adhesive structure 610 has a waterproofness reaching the standard.

Specifically, in the process of measuring the resistance by the multimeter, one end of a meter pen may be placed on a surface of a battery metal cover, the other end of the meter pen may be placed on a surface of a metal container, a voltage of 0.1 V is applied, and a resistance result is recorded to complete the measurement of the resistance.

In order to avoid the adhesion between the first adhesive structures 510 corresponding to adjacent cells 400, the second adhesive structure 610 has a thickness greater than that of the first adhesive structure 510. The specific thickness may be determined according to actual situations, and will not be specifically defined in the embodiments of the present application.

In an implementation of the embodiment of the present application, the second adhesive structure 610 may be made of a mixture of at least one or two of polyurethane and epoxy resin.

Figure 7:
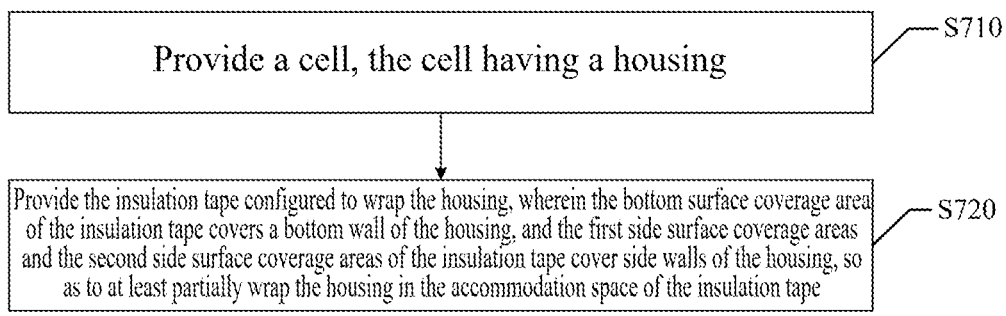
FIG. 7 is a flow chart of a method for preparing a battery unit of an embodiment of the present application.

In a further aspect, the present application further provides a method for preparing a battery unit. As shown in FIG. 7, the method for preparing a battery unit may include:

S710: providing a cell, the cell having a housing; and

Step S720: providing the insulation tape described above, the insulation tape being configured to wrap the housing. The bottom surface coverage area of the insulation tape covers a bottom wall of the housing, and the first side surface coverage areas and the second side surface coverage areas of the insulation tape cover side walls of the housing, so as to at least partially wrap the housing in the accommodation space of the insulation tape.

Specific details of the method for preparing a battery unit have been described in detail in the embodiments of the corresponding battery unit and the corresponding insulation tape, and therefore will not be described herein again.

Figure 8:
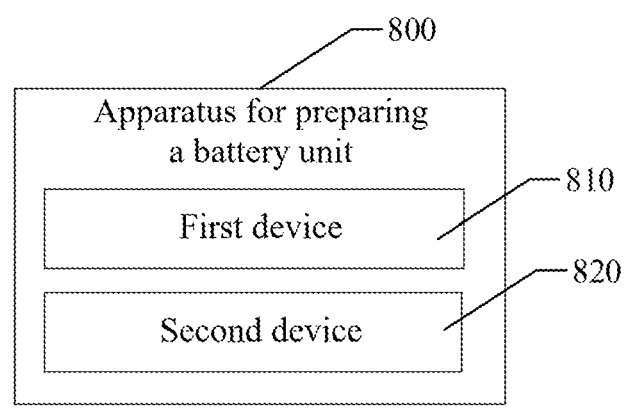
FIG. 8 is a block diagram of an apparatus for preparing a battery unit of an embodiment of the present application.

In a still further aspect, the present application further provides an apparatus for preparing a battery unit. With reference to FIG. 8, a block diagram of an apparatus for preparing a battery unit according to an embodiment of the present application is shown. As shown in FIG. 8, the apparatus for preparing a battery unit 800 may include:

a first device 810 capable of providing a cell, the cell having a housing; and a second device 820 capable of providing the insulation tape described above, the insulation tape being configured to wrap the housing. The bottom surface coverage area of the insulation tape covers a bottom wall of the housing, and the first side surface coverage areas and the second side surface coverage areas of the insulation tape cover side walls of the housing, so as to at least partially wrap the housing in the accommodation space of the insulation tape.

Specific details of the apparatus for preparing a battery unit have been described in detail in the embodiments of the corresponding battery unit and the corresponding insulation tape, and therefore will not be described herein again.

In a yet further aspect, the present application further provides a power consuming device, including the battery described above. The battery is configured to supply electric energy. The specific structural form and working principle of the battery have been described in detail in the above embodiments, and will not be described again in this embodiment.

For the claimed subject matter of the present application and the features in the embodiments, reference can be made to each other, and those skilled in the art can also flexibly combine the technical features in different embodiments to form more embodiments as long as the structure is allowed.

The insulation tape, the battery unit, the battery, the method and apparatus for preparing a battery unit, and the power consuming device provided in the present application are introduced in detail above. Specific embodiments are used for illustrating principles and implementations of the present application herein. The above description of the embodiments is only used for helping understand the method and its core concept of the present application. It should be noted that several improvements and modifications may also be made by those of ordinary skill in the art without departing from the principles of the present application, and should also fall within the scope of protection of the present application.

The invention claimed is:

1. An insulation tape, comprising a bottom surface coverage area, and a plurality of first side surface coverage areas and a plurality of second side surface coverage areas which are alternately arranged, wherein a total number of the first side surface coverage areas and the second side surface coverage areas are equal to a number of edges of the bottom surface coverage area, and each of the edges of the bottom surface coverage area is connected to one of the first side surface coverage areas or one of the second side surface coverage areas; and, wherein each of the first side surface coverage areas comprises a bottom covering portion and two side surface overlapping portions, a bottom edge of the bottom covering portion being connected to one of the edges of the bottom surface coverage area, and the two side surface overlapping portions being respectively connected to the two second side surface coverage areas on two sides of the first side surface coverage area;

the bottom covering portions of the plurality of first side surface coverage areas and the second side surface coverage areas are all located on the same side of the bottom surface coverage area, so as to form an accommodation space, and the two side surface overlapping portions are arranged on the bottom covering portion in an overlapping manner, so as to seal the bottom of the accommodation space; and the bottom covering portion comprises a middle area, and a first side edge area and a second side edge area which are connected to two sides of the middle area, each one of the two side surface overlapping portions comprises an upper area and a lower area which are connected to each other, the lower area covers a part of the first side edge area or a part of the second side edge area, and the upper area covers a remaining part of the first side edge area or a remaining part of the second side edge area.

2. The insulation tape according to claim 1, wherein two side edges of the bottom covering portion are respectively connected to the two side surface overlapping portions.

3. The insulation tape according to claim 2, wherein a side edge of the first side edge area being connected to one of the side surface overlapping portions, and a side edge of the second side edge area being connected to the other side surface overlapping portion; and
the first side edge area, the side surface overlapping portion connected to the first side edge area, the second side edge area and the side surface overlapping portion connected to the second side edge area are all arranged on the middle area in an overlapping manner.

4. The insulation tape according to claim 1, wherein the upper area, the lower area and the adjacent second side surface coverage area are connected into a whole.

5. The insulation tape according to claim 4, wherein edges of the upper area and the lower area that are connected to the second side surface coverage area have a total length the same as a length of a corresponding edge of the second side surface coverage area, and are connected to the corresponding edge of the second side surface coverage area in an aligned manner.

6. The insulation tape according to claim 1, wherein the upper area is rectangular, the lower area is triangular, and the edge of the upper area connected to the lower area has a length greater than or equal to that of the edge of the lower area connected to the upper area.

7. The insulation tape according to claim 1, wherein a distance between the edge of the side surface overlapping portion away from the second side surface coverage area connected thereto and the other second side surface coverage area is less than a first preset distance.

8. The insulation tape according to claim 1, wherein the bottom edge of the bottom covering portion and a corresponding edge of the bottom surface coverage area have the same length and are connected to each other in an aligned manner.

9. The insulation tape according to claim 1, wherein the bottom of the first side surface coverage area is coated with a first adhesive structure, a bottom edge of the first adhesive structure is flush with a bottom edge of the first side surface coverage area, and a second preset distance is reserved between a side edge of the first adhesive structure and a side edge of the first side surface coverage area.

10. The insulation tape according to claim 9, wherein the first adhesive structure has a height greater than that of the bottom covering portion.

11. The insulation tape according to claim 1, wherein the accommodation space is configured to wrap a cell or a battery module.

12. The insulation tape according to claim 11, wherein an inner wall of the accommodation space is connected to the cell or the battery module in a bonded manner.

13. The insulation tape according to claim 1, wherein the insulation tape is made of a waterproof material.

14. A battery unit comprising a cell and an insulation tape of claim 1, wherein
the cell is provided with a housing, a bottom wall of the housing is covered by the bottom surface coverage area of the insulation tape, and side walls of the housing are covered by the first side surface coverage areas and the second side surface coverage areas of the insulation tape, so as to at least partially wrap the cell in the accommodation space of the insulation tape.

15. A battery comprising a plurality of battery units of claim 14.

16. A battery comprising an insulation tape of claim 1 and a plurality of cells, wherein
the plurality of cells are wrapped in the accommodation space of the insulation tape;
the bottom of each first side surface coverage area of the insulation tape is coated with a first adhesive structure, and
each first side surface coverage area of the insulation tape for wrapping the cells is further coated with a second adhesive structure configured to be connected to an adjacent cell of the plurality of cells.

17. The battery according to claim 16, wherein in a height direction of the cells, the second adhesive structure is located above the first adhesive structure of the insulation tape, and the second adhesive structure and the first adhesive structure are spaced apart by a preset distance.

18. The battery according to claim 17, wherein the second adhesive structure has a viscosity greater than that of the first adhesive structure, and the second adhesive structure has a waterproofness lower than that of the first adhesive structure.

19. The battery according to claim 17, wherein the second adhesive structure has a thickness greater than that of the first adhesive structure.

* * * * *